(12) United States Patent
Abe et al.

(10) Patent No.: US 11,604,344 B2
(45) Date of Patent: Mar. 14, 2023

(54) DOT SIGHT

(71) Applicant: LIGHT OPTICAL WORKS, LTD., Nagano (JP)

(72) Inventors: Takashi Abe, Nagano (JP); Masatomi Iwanami, Nagano (JP)

(73) Assignee: LIGHT OPTICAL WORKS, LTD., Nagano (JP)

( * ) Notice: Subject to any disclaimer, the term of this patent is extended or adjusted under 35 U.S.C. 154(b) by 115 days.

(21) Appl. No.: 17/271,217

(22) PCT Filed: Sep. 3, 2018

(86) PCT No.: PCT/JP2018/032576
§ 371 (c)(1),
(2) Date: Feb. 25, 2021

(87) PCT Pub. No.: WO2020/049609
PCT Pub. Date: Mar. 12, 2020

(65) Prior Publication Data
US 2021/0247055 A1  Aug. 12, 2021

(51) Int. Cl.
*G02B 23/16* (2006.01)
*G02B 7/02* (2021.01)
(Continued)

(52) U.S. Cl.
CPC ............. *G02B 23/16* (2013.01); *F41G 1/30* (2013.01); *G02B 7/02* (2013.01); *G02B 25/001* (2013.01); *F41G 11/003* (2013.01)

(58) Field of Classification Search
CPC ......... F41G 1/30; F41G 11/003; G02B 23/16; G02B 7/02; G02B 25/001
See application file for complete search history.

(56) References Cited

U.S. PATENT DOCUMENTS 3,942,901 A * 3/1976 Ekstrand ............... G02B 27/30
 359/635
5,189,555 A * 2/1993 Jorlov ................ G02B 23/105
 359/618
(Continued)

FOREIGN PATENT DOCUMENTS

JP H09509257 9/1997
JP 2003504592 2/2003
(Continued)

OTHER PUBLICATIONS

"Office Action of Germany Counterpart Application", dated Dec. 16, 2021, with English translation thereof, pp. 1-13.
(Continued)

*Primary Examiner* — Joshua E Freeman
(74) *Attorney, Agent, or Firm* — JCIPRNET (57) ABSTRACT

A compact dot sight is provided, in which the inner cylinder is eliminated and no structure protrudes from the left and right side walls of a lens barrel. The dot sight includes: a lens barrel; objective lenses fixed to a front opening of the lens barrel; an eyepiece lens fixed to a rear opening of the lens barrel; a light source for projecting a point image from an inside of the lens barrel to the objective lens; a power supply circuit for supplying power to the light source; and a dot adjustment mechanism that has a holder of the light source and can adjust the position of the point image projected on the objective lens by moving the holder vertically and horizontally.

2 Claims, 7 Drawing Sheets (51) Int. Cl.
    *G02B 25/00*     (2006.01)
    *F41G 1/30*     (2006.01)
    *F41G 11/00*     (2006.01)

(56) References Cited

U.S. PATENT DOCUMENTS

| | | | | |
|---|---|---|---|---|
| 5,383,278 | A * | 1/1995 | Kay | G02B 23/105 124/87 |
| 5,440,387 | A * | 8/1995 | Montelin | G02B 23/105 42/113 |
| 5,594,584 | A * | 1/1997 | Kay | F41G 1/345 359/429 |
| 6,373,628 | B1 * | 4/2002 | Gunnarsson | F41G 1/30 359/399 |
| 6,516,551 | B2 * | 2/2003 | Gaber | F41G 1/30 356/256 |
| 6,967,775 | B1 * | 11/2005 | Millett | G02B 23/10 359/405 |
| 7,797,843 | B1 * | 9/2010 | Scott | G02B 23/14 33/227 |
| 10,234,238 | B1 * | 3/2019 | Thomas | F41G 3/08 |
| 2005/0225853 | A1 * | 10/2005 | Hakansson | F41G 1/30 359/399 |
| 2007/0214701 | A1 * | 9/2007 | Grauslys | F41G 1/38 42/131 |
| 2011/0297744 | A1 * | 12/2011 | Schneider | F41G 1/467 235/414 |
| 2013/0188180 | A1 * | 7/2013 | Jakob | F41G 1/38 356/248 |
| 2014/0237884 | A1 * | 8/2014 | Koesler | F41G 1/38 42/111 |
| 2015/0168102 | A1 * | 6/2015 | Jeung | F41G 1/30 42/130 |
| 2017/0038177 | A1 | 2/2017 | Sun | |
| 2018/0045486 | A1 | 2/2018 | Jeung et al. | |
| 2018/0128574 | A1 * | 5/2018 | Crispin | G02B 23/105 |
| 2019/0277600 | A1 * | 9/2019 | Larsson | F41G 1/345 |
| 2021/0341255 | A1 * | 11/2021 | Jeung | F41G 1/14 |
| 2022/0099409 | A1 * | 3/2022 | Larsson | F41G 1/30 |

FOREIGN PATENT DOCUMENTS

| | | |
|---|---|---|
| JP | 2010528251 | 8/2010 |
| WO | 0106199 | 1/2001 |
| WO | 2006133029 | 12/2006 |
| WO | 2008153741 | 12/2008 |

OTHER PUBLICATIONS

Office Action of Japan Counterpart Application, with English translation thereof, dated Mar. 15, 2022, pp. 1-6.
"International Search Report (Form PCT/ISA/210) of PCT/JP2018/032576," dated Nov. 20, 2018, with English translation thereof, pp. 1-4.

* cited by examiner

DOT SIGHT

CROSS-REFERENCE TO RELATED APPLICATION

This application is a 371 application of the international PCT application serial no. PCT/JP2018/032576, filed on Sep. 3, 2018. The entirety of the above-mentioned patent application is hereby incorporated by reference herein and made a part of this specification.

TECHNICAL FIELD

The present invention relates to a dot sight that aims a point image of a light source projected on an objective lens at a target in an overlapping manner.

BACKGROUND ART

Figure 12A:
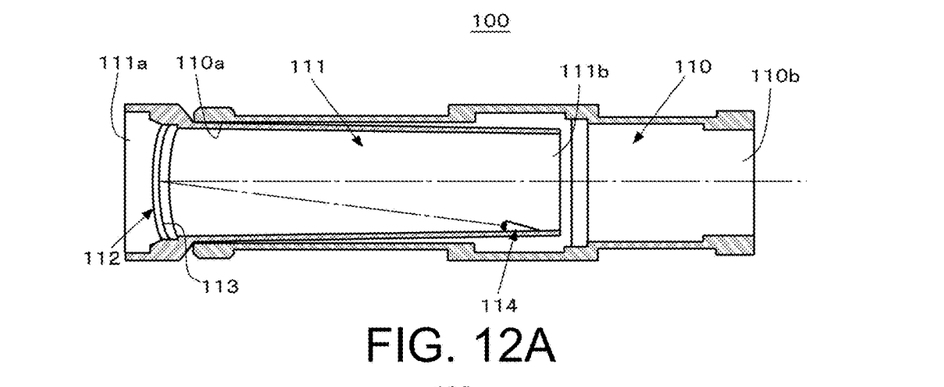
FIG. 12A is a cross-sectional view illustrating a dot sight in the related art.
Figure 12B:
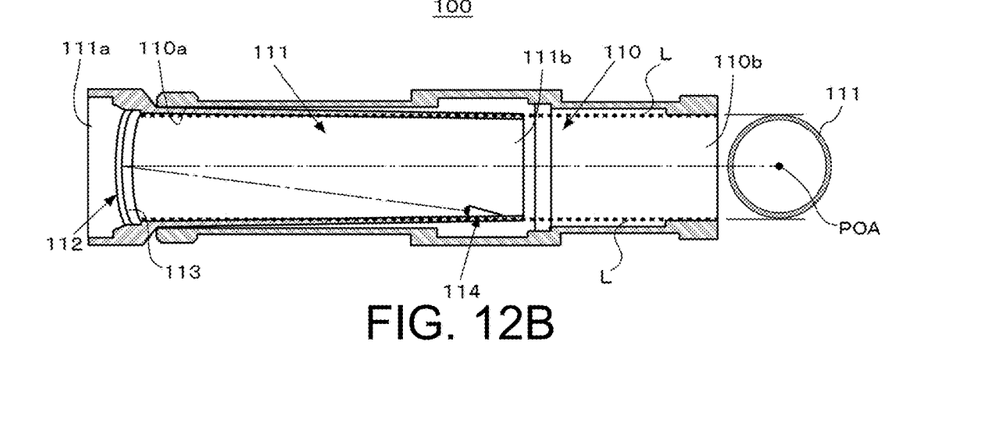
FIG. 12B is a cross-sectional view illustrating mechanical vignetting in the dot sight in the related art.

A dot sight is an optical sighting device which is used in a hand gun, a rifle, or the like. A dot sight projects a point image of a light source on an objective lens to form a point of aim. There are two types of dot sights, a tube type that includes a lens barrel and an open type that does not include a lens barrel. A tube type dot sight in the related art is disclosed in, for example, International Publication No. WO 01/06199 (Patent Literature 1) and International Publication No. WO 2006/133029 (Patent Literature 2). FIG. 12A and FIG. 12B illustrate a configuration of a tube type dot sight 100 in the related art.

In FIG. 12A, the dot sight 100 includes a lens barrel including an outer cylinder 110 and an inner cylinder 111. The inner cylinder 111 is configured to be inserted into a front opening 110a of the outer cylinder 110 and to be movable in an up-down direction and a right-left direction inside the outer cylinder 110. A configuration for making the inner cylinder 111 movable in an up-down direction and a right-left direction is disclosed in, for example, FIG. 5A of International Publication No. WO 2008/153741 (Patent Literature 3).

Two objective lenses 112 are attached to the front opening 111a of the inner cylinder 111. A layer 113 reflecting only light having a predetermined wavelength is coated between the two objective lenses 112. A light source 114 such as an LED is provided in the vicinity of a rear opening 111b on the inner side of the inner cylinder 111. The color of light emitted by the light source 114 is, for example, red. In this case, the layer 113 between the two objective lenses 112 reflects only light having a red light emission wavelength. Meanwhile, an eyepiece lens not shown in the drawing is attached to the rear opening of the outer cylinder 110.

An alternating dotted-dashed line in FIG. 12A indicates a path of light emitted from the light source 114. The light emitted from the light source 114 is reflected by the layer 113 between the two objective lenses 112. A point image of the light source 114 is projected on the surface of the layer 113, and a point of aim (POA) is formed in the center of the objective lens 112. A user, who is a shooter, looks into the dot sight 100 through an eyepiece lens and aims the point of aim formed in the center of the objective lens 112 at a target in an overlapping manner.

Here, the position of the point of aim of the dot sight 100 is required to be adjusted in accordance with a gun in which the dot sight 100 is used. That is, a trajectory of the gun is not constant because it is determined by various factors. For this reason, the position of the point of aim of the dot sight 100 is adjusted to match the position of a point of impact of the gun in which the dot sight 100 is used. This adjustment is generally called "zeroing." In the dot sight 100 of the related art, the position of a point of aim is adjusted by moving the inner cylinder 111 provided with the light source 114 in an up-down direction and a right-left direction.

CITATION LIST

Patent Literature

[Patent Literature 1]: International Publication No. WO 01/06199
[Patent Literature 2]: International Publication No. WO 2006/133029
[Patent Literature 3]: International Publication No. WO 2008/153741

SUMMARY OF INVENTION

Technical Problem

<Mechanical Vignetting>

The dot sight 100 in the related art causes mechanical vignetting by the inner cylinder 111 inserted into the outer cylinder 110. The mechanical vignetting will be described with reference to FIG. 12B. A view line L in FIG. 12B indicates a field of vision of the dot sight 100, that is, a range which is seen through the dot sight 100. The inner cylinder 111 interferes with the view line L and forms a black edge (see a black circle in the drawing) in the vicinity of the field of vision of the dot sight 100. The black edge formed by the inner cylinder 111 narrows the field of vision of the dot sight 100 and makes it difficult to rapidly and accurately perform aiming.

<Poa Shift>

The dot sight 100 in the related art is configured to elastically support the inner cylinder 111 using a spring in order to make the inner cylinder 111 movable in an up-down direction and a right-left direction (FIG. 5A in Patent Literature 3). The inner cylinder 111 is formed of a metal and has a relatively large mass. For this reason, the inner cylinder 111 supported by the spring is easily moved by an impact (gravitational acceleration) when a gun is shot, and a zeroing point of aim is easily shifted. Further, the spring supports the heavy inner cylinder 111 at all times and absorbs an impact when a gun is shot, and therefore the spring is easily fatigued and has low durability. Due to these defects, the dot sight 100 in the related art is not able to maintain high aiming accuracy for a long period of time.

<Amount of Movement of POA>

The dot sight 100 in the related art is configured to adjust the position of a point of aim by moving the inner cylinder 111 in an up-down direction and a right-left direction inside the outer cylinder 110. For this reason, the amount of movement of the point of aim is extremely small. The amount of movement of the point of aim increases when the diameter of the outer cylinder 110 is increased or the diameter of the inner cylinder 111 is reduced. However, in a case where the outer cylinder 110 is made larger, the dot sight 100 becomes larger. On the other hand, in a case where the inner cylinder 111 is made smaller, the range of the above-mentioned mechanical vignetting becomes wider.

<Deterioration of Visibility>

A dot sight in the related art is configured such that structures protrude from left and right side walls of a lens barrel. For example, a dot sight disclosed in Patent Literature 2 is configured such that a battery holder and a tube protrude from left and right side walls of an outer cylinder. In addition, an optical gun sight disclosed in Patent Literature 3 is configured such that an adjustment assembly and a bias assembly protrude from left and right side walls of a housing. However, a user uses a dot sight with both eyes open. That is, the user looks into the dot sight with one eye and visually recognizes a target and its surroundings with the other eye. The structures protruding from the left and right side walls of the lens barrel obstruct a field of view of the other eye not looking into the dot sight, thereby reducing visibility when the user aims at the target.

<Objective of Invention>

An objective of the present invention is to provide a compact dot sight in which an inner cylinder is eliminated and no structure protrudes from left and right side walls of a lens barrel.

Solution to Problem (1) In order to achieve the above-described object, a dot sight of the present invention is a dot sight including a lens barrel, an objective lens fixed to a front opening of the lens barrel, an eyepiece lens fixed to a rear opening of the lens barrel, a light source configured for projecting a point image on the objective lens from an inside of the lens barrel, a power supply circuit configured for supplying power to the light source, and a dot adjustment mechanism including a holder of the light source and capable of adjusting a position of the point image projected on the objective lens by moving the holder in an up-down direction and a right-left direction, in which the lens barrel is configured such that a diameter of the front opening is larger than a diameter of the rear opening, at least an inner surface shape between the objective lens and the eyepiece lens is substantially a truncated conical shape, and there is no mechanical and optical structure other than the light source and the holder are present in an inner space between the objective lens and the eyepiece lens, and the point image is directly projected on the objective lens from the light source.

(2) Preferably, in the dot sight of (1), the power supply circuit and the dot adjustment mechanism are both provided on an upper side of the lens barrel.

(3) Preferably, in the dot sight of (1) or (2), the dot adjustment mechanism includes a first mechanism configured for moving the light source in the up-down direction and a second mechanism configured for moving the first mechanism in the right-left direction, the first mechanism includes the holder that holds the light source, a spring that supports the holder, a first screw that moves the holder in the up-down direction, and a first guide pin that guides the holder in the up-down direction, and the second mechanism includes first and second mobile objects that are provided in front of and behind the holder, extend in the right-left direction of the holder, and hold the holder to be movable in the up-down direction, a second screw that penetrates the first mobile object in the right-left direction and moves the first mobile object in the right-left direction, and a second guide pin that penetrates the second mobile object in the right-left direction and guides the second mobile object in the right-left direction.

Advantageous Effects of Invention

According to the present invention, it is possible to provide a compact dot sight in which an inner cylinder is eliminated and no structure protrudes from left and right side walls of a lens barrel.

DESCRIPTION OF EMBODIMENTS

Hereinafter, a dot sight according to an embodiment of the present invention will be described with reference to the drawings.

<Outline of Dot Sight>

Figure 9:
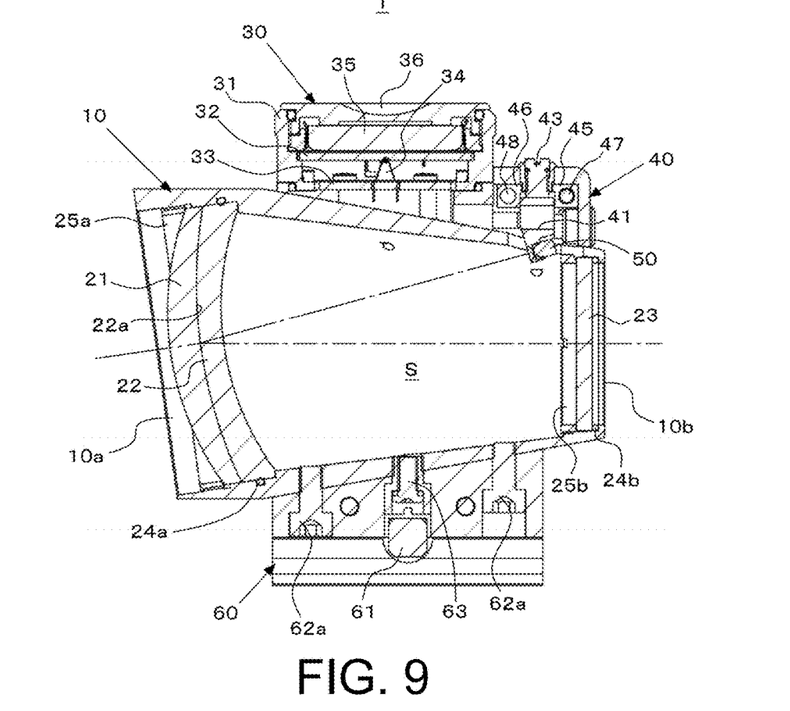
FIG. 9 is a cross-sectional view illustrating the dot sight.

FIG. 1 to FIG. 8 illustrate an exterior of a dot sight 1 according to an embodiment of the present invention. FIG. 9 illustrates the inside of the dot sight 1. The dot sight 1 mainly includes a lens barrel 10, a first objective lens 21, a second objective lens 22, an eyepiece lens 23, a power supply circuit 30, a dot adjustment mechanism 40, a light source 50, and a clamp mechanism 60.

Figure 1:
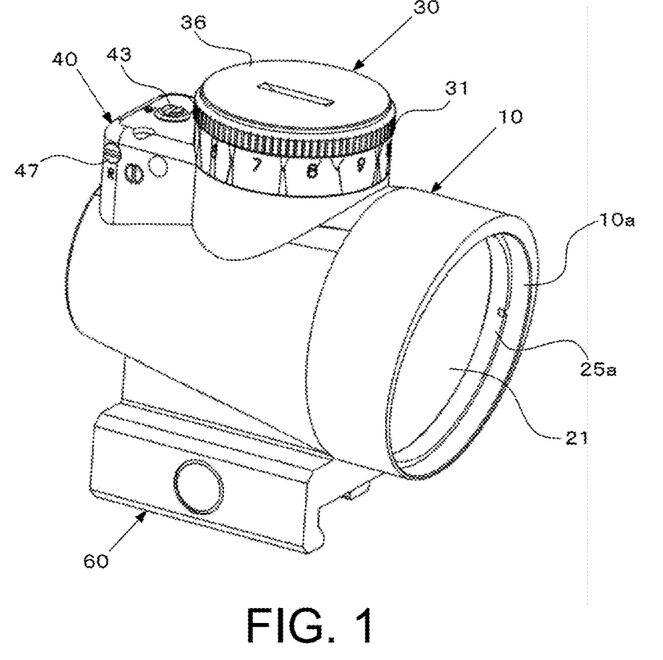
FIG. 1 is a front perspective view illustrating a dot sight according to an embodiment of the present invention.
Figure 2:
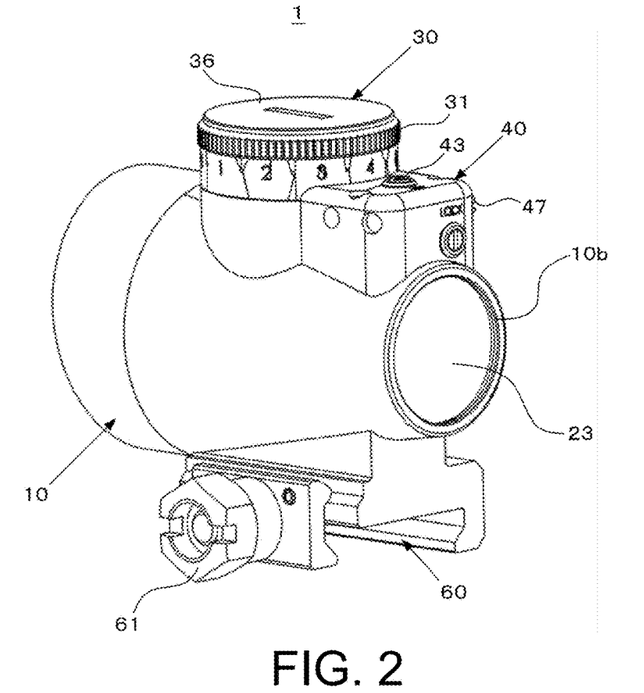
FIG. 2 is a rear perspective view illustrating the dot sight.
Figure 3:
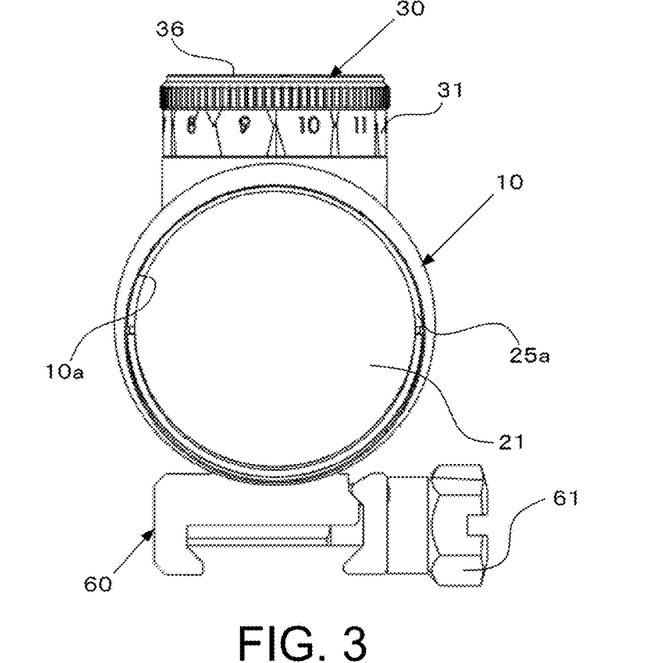
FIG. 3 is a front view illustrating the dot sight.

As illustrated in FIG. 1 and FIG. 2, both the first and second objective lenses 21 and 22 are fixed to a front opening 10a of the lens barrel 10. On the other hand, the eyepiece lens 23 is fixed to a rear opening 10b of the lens barrel 10. Both the power supply circuit 30 and the dot adjustment mechanism 40 are provided in proximity to an upper side of the lens barrel 10. The clamp mechanism 60 is provided on a lower side of the lens barrel 10.

As illustrated in FIG. 9, the light source 50 is held by a holder 41 of the dot adjustment mechanism 40 inside the lens barrel 10. The surface of the second objective lens 22 is coated with a layer 22a that reflects only light having a predetermined wavelength. A point image of the light source 50 is projected on the layer 22a of the second objective lens 22, and a point of aim (POA) is formed in substantially the center of the second objective lens 22.

The light source 50 is turned on by power supplied from the power supply circuit 30. The power supply circuit 30 includes a brightness adjustment dial 31. The brightness of a point of aim can be adjusted by rotating the brightness adjustment dial 31. The position of the point of aim can be moved in an up-down direction and a right-left direction by the dot adjustment mechanism 40.

<Lens Barrel>

As illustrated in FIG. 1 to FIG. 8, the lens barrel 10 includes the front opening 10a having a large diameter and the rear opening 10b having a small diameter. As described already, the first and second objective lenses 21 and 22 are fixed to the front opening 10a. The eyepiece lens 23 is fixed to the rear opening 10b. As illustrated in FIG. 9, an inner shape of the lens barrel 10 between the first and second objective lenses 21 and 22 and the eyepiece lens 23 is substantially a truncated conical shape. Mechanical and optical structures other than the light source 50 and the holder 41 are not present in an inner space S of the lens barrel 10 between the first and second objective lenses 21 and 22 and the eyepiece lens 23. Thus, the point image of the light source 50 is directly projected on the layer 22a of the second objective lens 22 without pass through other members and being reflected from other members. The inner space S of the lens barrel 10 is filled with an inert gas such as nitrogen or argon. The inert gas filled in the inner space S prevents fogging of the second lens 22 and the eyepiece lens 23 due to a difference in temperature between the outside and the inside of the lens barrel 10. Although a material of the lens barrel 10 is not particularly limited, a lightweight metal such as aluminum or a magnesium alloy is preferably used.

<Lens>

As illustrated in FIG. 9, both the first and second objective lenses 21 and 22 are convex meniscus lenses of equal magnification. The rear surface of the first objective lens 21 and the surface of the second objective lens 22 are bonded to each other without a gap and constitute one group of lenses. The surface of the second objective lens 22 is coated with the layer 22a that reflects only light having a predetermined wavelength emitted from the light source 50. For example, in a case where the light source 50 is a red LED, the layer 22a is preferably a die clock mirror coat reflecting light having a wavelength centered on 640 nm. In addition, the magnification of the first and second objective lenses 21 and 22 is not particularly limited, but is preferably set to one to three times. In the present embodiment, the magnification of the first and second objective lenses 21 and 22 is set to one time, and the eyepiece lens 23 is constituted by plane glass.

The first and second objective lenses 21 and 22 are fixed to the front opening 10a from the outside of the lens barrel 10 by a lock ring 25a. On the other hand, the eyepiece lens 23 is fixed to the rear opening 10b from the inside of the lens barrel 10 by a lock ring 25b. An O-ring 24a is pressed between the outer peripheral surface of the second objective lens 22 and the inner peripheral surface of the front opening 10a. On the other hand, an O-ring 24b is pressed between a rear surface peripheral edge of the eyepiece lens 23 and an inner peripheral edge of the rear opening 10b. The inner space S of the lens barrel 10 is sealed by the O-rings 24a and 24b.

<Power Supply Circuit>

As illustrated in FIG. 9, the power supply circuit 30 includes a brightness adjustment dial 31, a first circuit board 32, a second circuit board 33, a contact point 34, a battery 35, and a lid 36. The brightness adjustment dial 31 is attached to the upper side of the lens barrel 10 so as to be rotatable. The brightness adjustment dial 31 is an operation unit which is rotatable in a horizontal direction, and constitutes a housing of the power supply circuit 30. That is, all of the first circuit board 32, the second circuit board 33, the contact point 34, and the battery 35 are accommodated in the brightness adjustment dial 31. The first circuit board 32 is fixed to substantially the center of the brightness adjustment dial 31, and forms an accommodation portion of the battery 35 in an upper portion of the brightness adjustment dial 31. The accommodation portion is sealed by a lid 36. The first circuit board 32, the battery 35, and the lid 36 are rotated in a horizontal direction together with the brightness adjustment dial 31. On the other hand, the contact point 34 is fixed to the second circuit board 33. The second circuit board 33 is fixed to an upper side of the lens barrel 10.

The power of the battery 35 is supplied to the light source 50 through the first circuit board 32, the contact point 34, and the second circuit board 33. When the brightness adjustment dial 31 is rotated in a horizontal direction, a contact position between the first circuit board 32 and the contact point 34 is changed, and thus a resistance value of the first circuit board 32 changes. As a result, the brightness of the light source 50 changes, and the brightness of a point of aim projected on the layer 22a of the second objective lens 22 is adjusted.

<Dot Adjustment Mechanism>

As illustrated in FIG. 9, the dot adjustment mechanism 40 is provided on the upper side of the lens barrel 10 together with the above-described power supply circuit 30. Hereinafter, the dot adjustment mechanism 40 will be described with reference to FIG. 10A to FIG. 10E. The dot adjustment mechanism 40 includes a first mechanism for moving the light source 50 in the up-down direction and a second mechanism for moving the first mechanism in the right-left direction.

The first mechanism includes the holder 41, a spring 42, an elevation adjustment screw 43, and a pair of first guide pins 44 and 44. As described above, the holder 41 holds the light source 50. The spring 42 is provided horizontally inside the housing of the dot adjustment mechanism 40 and supports the holder 41 so as to be movable in the up-down direction and the right-left direction. The elevation adjustment screw 43 is vertically screwed to an upper wall of the housing of the dot adjustment mechanism 40. *A minus groove for rotating the elevation adjustment screw 43 is provided on an upper end of the elevation adjustment screw 43.* On the other hand, a lower end of the elevation adjustment screw 43 abuts on the upper surface of the holder 41 inside the housing of the dot adjustment mechanism 40. The pair of first guide pins 44 and 44 vertically penetrate the holder 41.

The holder 41 moves in the up-down direction along the first guide pins 44 and 44 by rotating the elevation adjustment screw 43. As a result, the position of the light source 50 changes in the up-down direction, and the position of a point of aim projected on the layer 22a of the second objective lens 22 is adjusted in the up-down direction.

The second mechanism includes a first mobile object 45, a second mobile object 46, a windage adjustment screw 47, and a second guide pin 48. The first and second mobile objects 45 and 46 are provided in front of and behind the holder 41 inside the housing of the dot adjustment mechanism 40. The first and second mobile objects 45 and 46 extend in the right-left direction of the holder 41 and hold the holder 41 so as to be movable in the up-down direction. For example, the first and second mobile objects 45 and 46 are provided with a convex portion extending in the up-down direction, and the holder 41 is provided with a concave portion extending in the up-down direction. The convex portion and the concave portion are coupled to each other, and thus the holder 41 is held between the first and second mobile objects 45 and 46 so as to be movable in the up-down direction along the convex portion and the concave portion.

Figure 7:
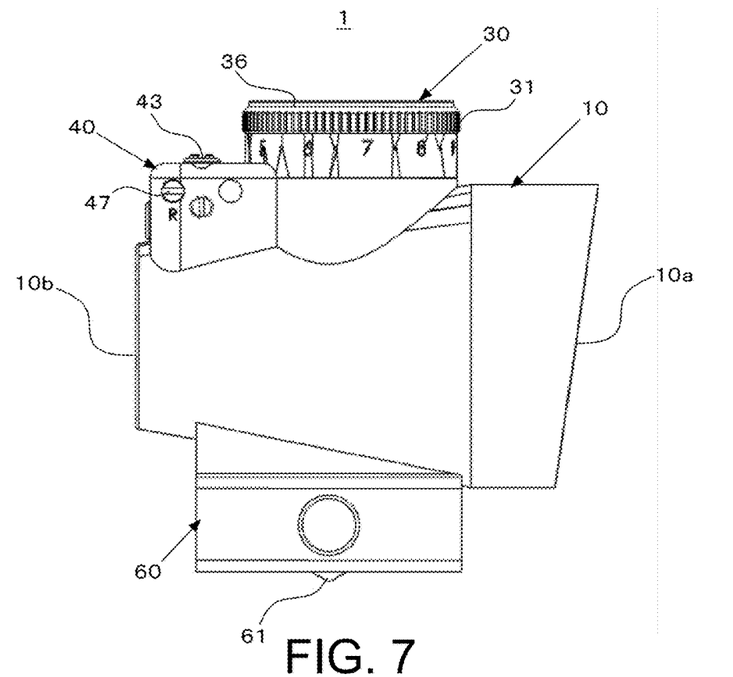
FIG. 7 is a left side view illustrating the dot sight.
Figure 8:
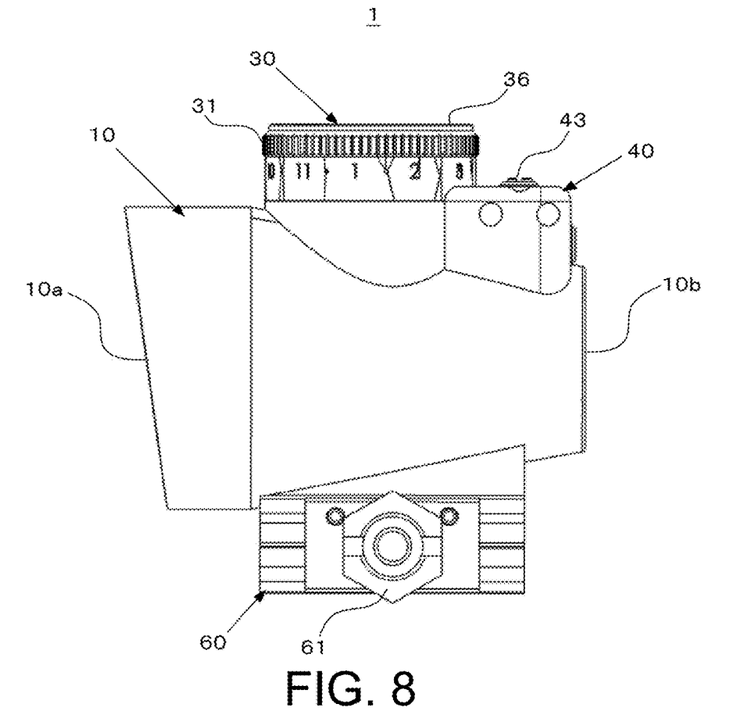
FIG. 8 is a right side view illustrating the dot sight.

The windage adjustment screw 47 and the second guide pin 48 are supported by left and right side walls of the housing of the dot adjustment mechanism 40 horizontally and in parallel. The windage adjustment screw 47 penetrates the first mobile object 45 in the right-left direction. The second guide pin 48 penetrates the second mobile object 46 in the right-left direction. A female screw is formed in a through hole of the first mobile object 45. The windage adjustment screw 47 is screwed to the female screw of the first mobile object 45. As illustrated in FIG. 7, a minus groove for rotating the windage adjustment screw 47 is provided at one end of the windage adjustment screw 47.

The first mobile object 45 is moved in the right-left direction by rotating the windage adjustment screw 47. The movement of the first mobile object 45 is transmitted to the holder 41 and the second mobile object 46. The holder 41 is guided to the second guide pin 48 through the second mobile object 46 and is moved in the right-left direction in a stable state. As a result, the position of the light source 50 changes in the right-left direction, and the position of a point of aim projected on the layer 22a of the second objective lens 22 is adjusted in the right-left direction.

<Clamp Mechanism>

As illustrated in FIG. 2, the clamp mechanism 60 is provided on the lower side of the lens barrel 10. The clamp mechanism 60 is configured to be openable and closeable in the horizontal direction by rotating the lock bolt 61. The clamp mechanism 60 clamps, for example, a Picatinny rail provided in a gun not illustrated in the drawing.

Figure 6:
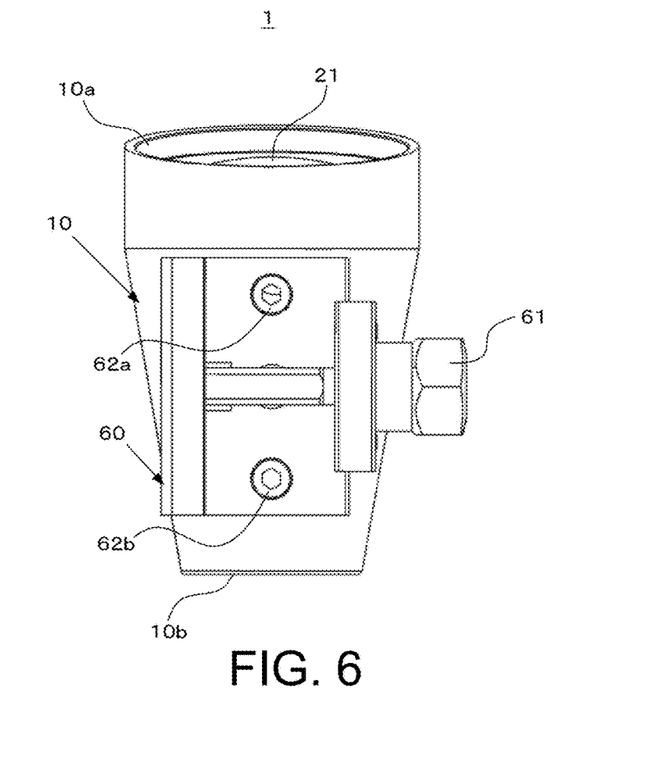
FIG. 6 is a bottom view illustrating the dot sight.

As illustrated in FIG. 6 and FIG. 9, the clamp mechanism 60 is fixed to the lower side of the lens barrel 10 by two connection bolts 62a and 62b. In addition, as illustrated in FIG. 9, a screw plug 63 is screwed to the center of the clamp mechanism 60. The screw plug 63 seals a through hole reaching the inner space S of the lens barrel 10 from the clamp mechanism 60. The above-described inert gas is filled in the inner space S of the lens barrel 10 from the through hole into which the screw plug 63 is screwed.

<First Effect>

Figure 11:
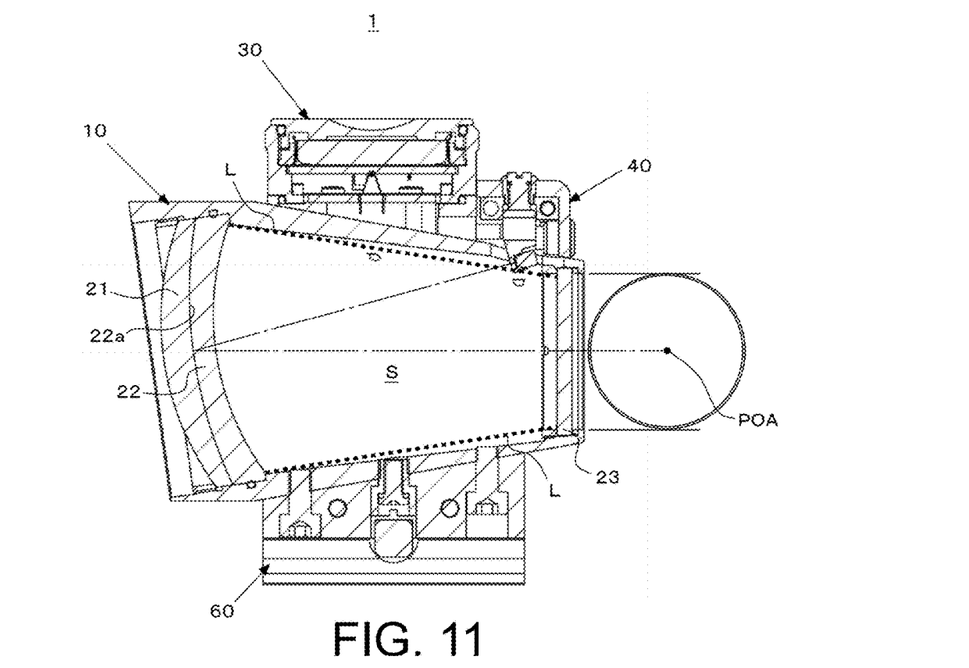
FIG. 11 is a cross-sectional view illustrating mechanical vignetting in the dot sight.

The dot sight 1 of the present embodiment can minimize mechanical vignetting. As illustrated in FIG. 11, the dot sight 1 can adjust the position of a point of aim (POA) without using the inner cylinder 111 as in the related art (see FIG. 12). In addition, the inner space S of the lens barrel 10 has substantially a truncated conical shape extending from the eyepiece side to the objective side, and a member interfering in the view line L is not present in the inner space S. Thereby, mechanical vignetting is minimized, and a field of vision of the dot sight 1 is greatly expanded. Thus, according to the dot sight 1 of the present embodiment, aiming can be performed rapidly and accurately.

<Second Effect>

Figure 10A:
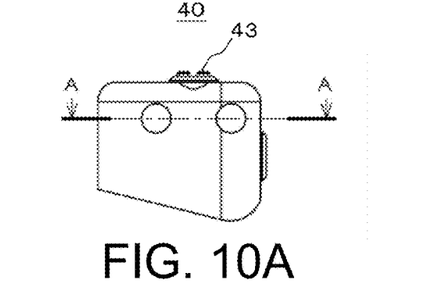
FIG. 10A is a right side view illustrating a dot adjustment mechanism of the dot sight.
Figure 10B:
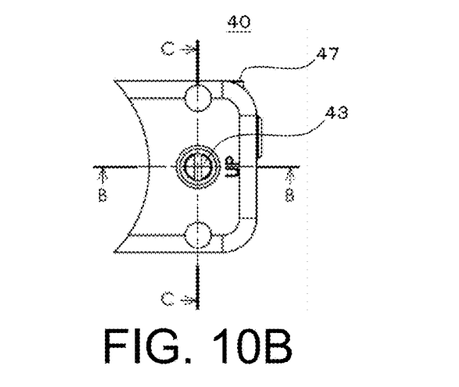
FIG. 10B is a plan view illustrating the dot adjustment mechanism of the dot sight.
Figure 10C:
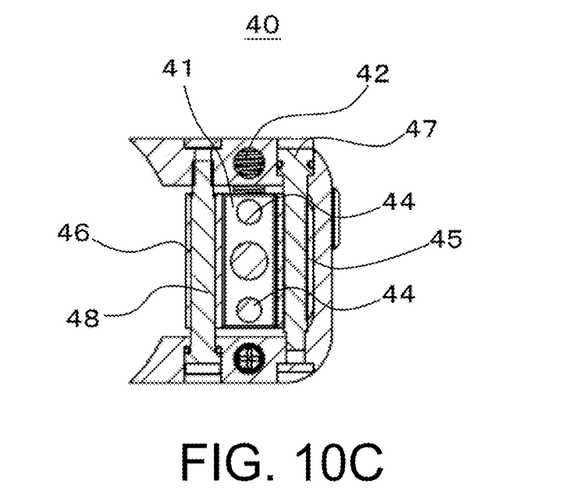
FIG. 10C is an A-A cross-sectional view of FIG. 10A.
Figure 10D:
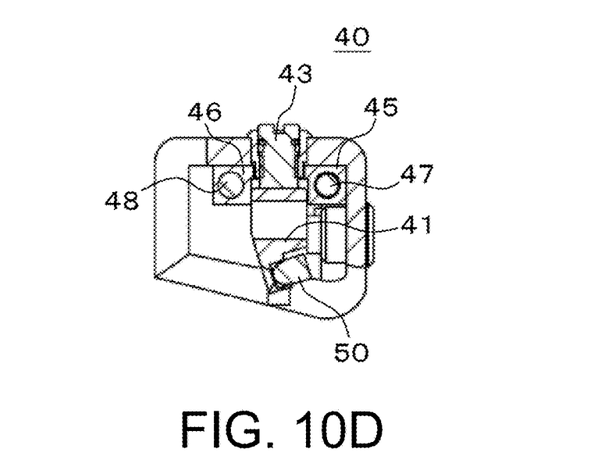
FIG. 10D is a B-B cross-sectional view of FIG. 10B.
Figure 10E:
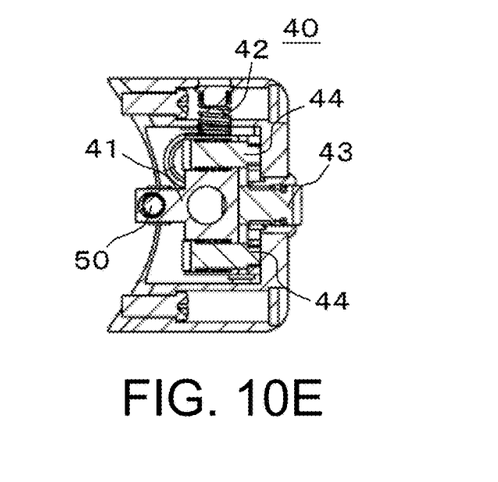
FIG. 10E is a C-C cross-sectional view of FIG. 10B.

As illustrated in FIG. 10C to FIG. 10E, the dot sight 1 of the present embodiment is configured to hold the light source 50 by the holder 41 having a small mass. The holder 41 having a small mass is difficult to move due to an impact (gravitational acceleration) when a gun is shot. Thus, in the dot adjustment mechanism 40 of the dot sight 1, a zeroing point of aim is hardly shifted even when an impact is applied at the time of gun shooting.

<Third Effect>

As illustrated in FIG. 10C to FIG. 10E, the dot sight 1 of the present embodiment can increase the amount of movement of a point of aim by increasing clearance in the up-down direction and the right-left direction of the holder 41 inside the housing of the dot adjustment mechanism 40. In this manner, even when the amount of movement of a point of aim is increased, the range of mechanical vignetting illustrated in FIG. 11 is not expanded.

<Fourth Effect>

Figure 4:
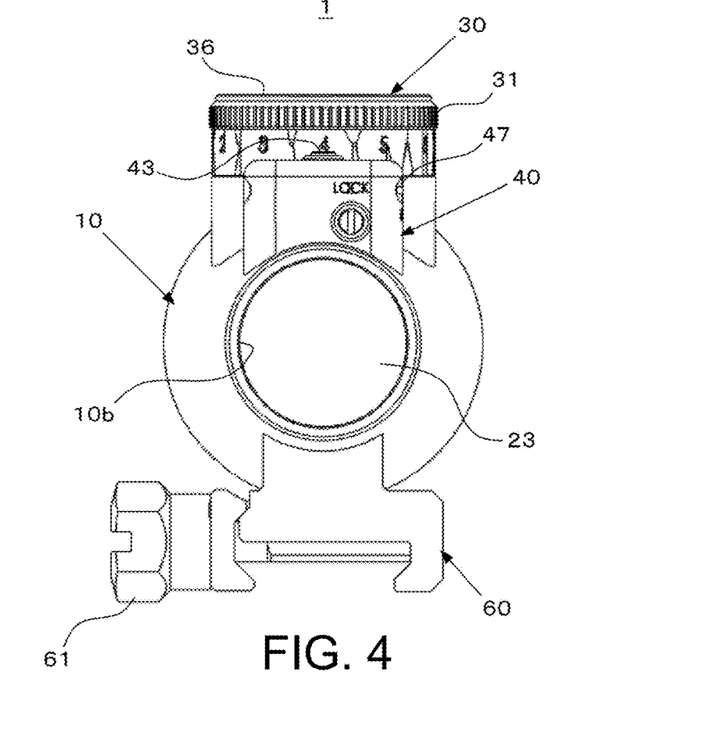
FIG. 4 is a rear view illustrating the dot sight.
Figure 5:
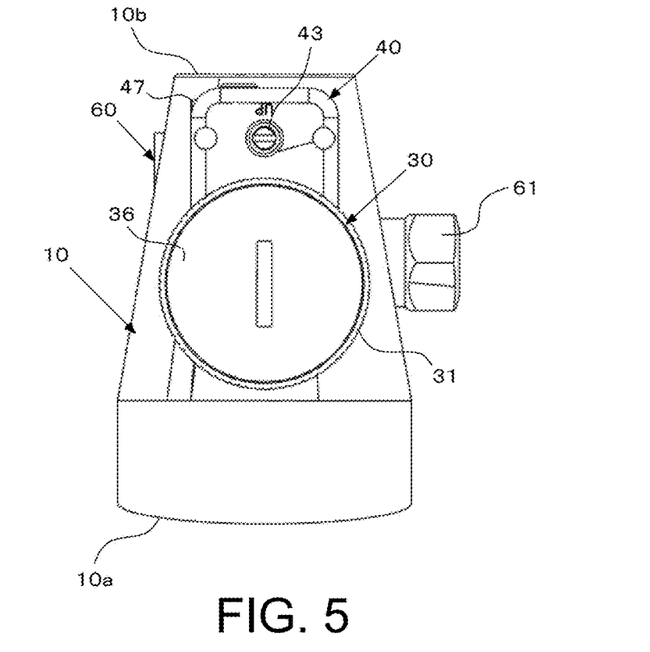
FIG. 5 is a plan view illustrating the dot sight.

As illustrated in FIG. 4, the dot sight 1 of the present embodiment is configured such that the power supply circuit 30 and the dot adjustment mechanism 40 are provided on the upper side of the lens barrel 10, and no structure protrudes from the left and right side walls of the lens barrel 10. With such a configuration, when a user looks into the dot sight 1 with one eye, a field of view of the other eye not looking into the dot sight is not obstructed. Thus, the user can satisfactorily visually recognize a target and its surroundings with the other eye not looking into the dot sight.

<Fifth Effect>

In the dot sight 1 of the present embodiment, the inner cylinder 111 in the related art (see FIG. 12), a configuration for holding the inner cylinder 111 inside the outer cylinder 110, and a configuration for making the inner cylinder 111 movable in an up-down direction and a right-left direction can be eliminated. As a result, the dot sight 1 becomes extremely light and compact.

<Others>

The dot sight of the present invention is not limited to the configuration of the above-described embodiment. Those skilled in the art will recognize that changes can be made in form and detail without departing from the spirit and scope of the invention.

The invention claimed is:

1. A dot sight, comprising:
   a lens barrel;
   an objective lens, fixed to a front opening of the lens barrel;
   an eyepiece lens, fixed to a rear opening of the lens barrel;
   a light source configured for projecting a point image on the objective lens from an inside of the lens barrel;
   a power supply circuit configured for supplying power to the light source; and
   a dot adjustment mechanism, including a holder of the light source and capable of adjusting a position of the point image projected on the objective lens by moving the holder in an up-down direction and a right-left direction,
   wherein
   the lens barrel is configured such that a diameter of the front opening is larger than a diameter of the rear opening,
   at least an inner surface shape between the objective lens and the eyepiece lens is substantially a truncated conical shape, and
   there is no mechanical and optical structure other than the light source and the holder are present in an inner space between the objective lens and the eyepiece lens, and the point image is directly projected on the objective lens from the light source;
   wherein the dot adjustment mechanism includes:
   a first mechanism configured for moving the light source in the up-down direction; and
   a second mechanism configured for moving the first mechanism in the right-left direction,
   wherein the first mechanism includes:
   the holder that holds the light source;
   a spring that supports the holder;
   a first screw that moves the holder in the up-down direction; and
   a first guide pin that guides the holder in the up-down direction,
   wherein the second mechanism includes:
   first and second mobile objects that are provided in front of and behind the holder, extend in the right-left direction of the holder, and hold the holder to be movable in the up-down direction;

a second screw that penetrates the first mobile object in the right-left direction and moves the first mobile object in the right-left direction; and a second guide pin that penetrates the second mobile object in the right-left direction and guides the second mobile object in the right-left direction.

2. The dot sight according to claim 1, wherein
the power supply circuit and the dot adjustment mechanism are both provided on an upper side of the lens barrel.

\* \* \* \* \*